G. E. PERRY.
PNEUMATIC BRUSH OR SPRAYER.
APPLICATION FILED NOV. 6, 1916.
1,332,996.
Patented Mar. 9, 1920.
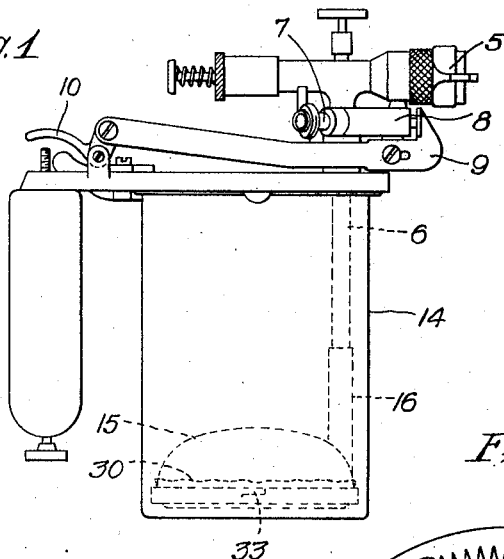
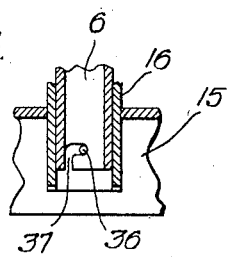
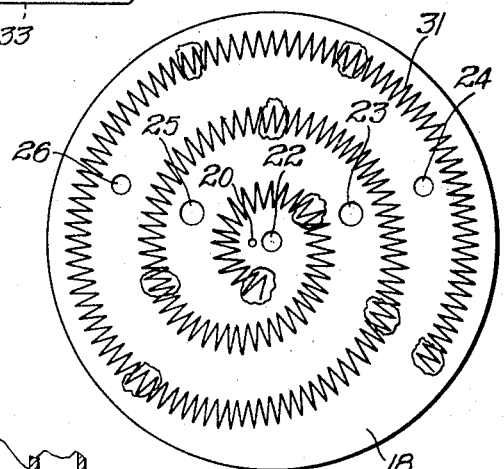
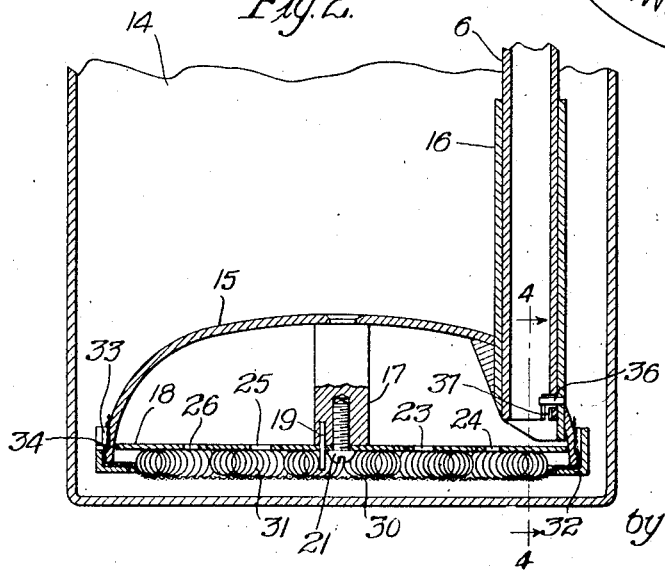
Inventor
George Elliot Perry
by J. E. Roberts Atty.

UNITED STATES PATENT OFFICE.

GEORGE ELLIOT PERRY, OF CHICAGO, ILLINOIS, ASSIGNOR TO WESTERN ELECTRIC COMPANY, INCORPORATED, OF NEW YORK, N. Y., A CORPORATION OF NEW YORK.

PNEUMATIC BRUSH OR SPRAYER.

1,332,996.   Specification of Letters Patent.   Patented Mar. 9, 1920.

Application filed November 6, 1916. Serial No. 129,847.

*To all whom it may concern:*

Be it known that I, GEORGE ELLIOT PERRY, a citizen of the United States, residing at Chicago, in the county of Cook and State of Illinois, have invented certain new and useful Improvements in Pneumatic Brushes or Sprayers, of which the following is a full, clear, concise, and exact description.

This invention relates to pneumatic brushes or sprayers, and more particularly to an improved means for subjecting fluids to the clarifying action of a suitable filter or strainer medium just prior to its introduction to the spray nozzle.

The object of this invention resides in the production of an improved and simplified straining or filtering means which is especially applicable to pneumatic sprayers or brushes and is characterized by a filtering mechanism which is removably attached to the spray supply pipe and which is equipped with a filtration area of substantially greater cross section than the cross sectional area of the spray supply pipe.

The improved filtering mechanism as herein disclosed functions to prevent impurities in the fluid from entering the spray supply pipe and thereby prevents clogging of the spray nozzle and also imperfections in the applied finish, due to fluid impurities, and said filtering action does not affect the constant and adequate supply of fluid to the supply nozzle.

Other features of the invention will become apparent from the following description and the appended claims.

Two general types of spraying apparatus are in commercial use. Those which have a large tank for storing the fluid, from which it is fed to the spray brush by gravity or suction or both, and those in which the fluid supply is contained in a pot or cup which is attached to the nozzle. The preferred form of the invention herein illustrated and described comprises the latter form of spraying apparatus; but it will be quite obvious that the invention is not limited to this particular form, but on the contrary is applicable to any form of spraying apparatus in which it is desired to feed a fluid free from impurities or foreign matter.

The invention is illustrated in the accompanying drawings in which:

Figure 1 is a side elevation of a pneumatic brush which illustrates the position of the fluid filtering or straining means in the fluid container;

Fig. 2 is an enlarged vertical section through the lower part of the tank, supply tube, and the strainer element supported therefrom.

Fig. 3 is a front elevation of the baffle plate of the filter or strainer, and

Fig. 4 is a section on the line 4—4 illustrating the connection between the spray supply pipe and the filter sleeve.

The pneumatic brush or sprayer as illustrated in Fig. 1 consists of a sprayer nozzle 5 which is connected to the liquid supply tube 6 and to the pneumatic or compressed air supply pipe 7. The pipe 7 is connected to a compressed air supply main, the supply of this compressed air to the nozzle 5 being controlled by a valve contained in the tube 8. This valve is operated by the lever 9 which in turn is controlled by the thumb lever 10. When the lever 10 is depressed the valve in the tube 8 is opened and compressed air from the supply main will be forced out through the spray nozzle 5. The passage of this air will create a suction in the feed tube 6 which will draw the liquid in the container 14 through said tube to the nozzle 5, from which the liquid will be ejected in a fine spray by the action of the compressed air.

The filtering means illustrated in Fig. 2 consists of a filter supporting means 15, to which is rigidly attached the sleeve 16. The filter supporting means 15 comprises a filter supporting area of substantially the cross section of the container 14 and its volume should be minimized as much as possible, so that the fluid displaced by its bulk when introduced in the container 14 will be inappreciable. In other words, the filter should possess a maximum filter area with a minimum displacement. Projecting from the center of the filter support 15 is the lug 17, to which the baffle plate 18 is secured by means of the screw 21. A pin 19 inserted in the lug 17 serves to properly position the baffle plate 18 with respect to the perforations in said plate hereinafter described, the pin 19 coöperating with the hole 20 in the baffle plate for this purpose. The baffle plate is tightly fitted within the filter support 15 between the nozzle supply pipe and the filtering means. The sprayer suction is transmitted through perforations 23, 24, 25, and 26 in the baffle plate. These perforations in the baffle plate are located at points midway between the source of suction and the farthest distant boundaries of the filter, or in any other position substantially near the median line of the filter, which tends to equalize the filter action over the entire surface of the filter. The baffle plate consequently serves to prevent a localized suction at the end of the nozzle supply pipe 6 and further tends to equalize the flow of the liquid through the entire area of the filter.

When the pneumatic sprayer is in operation considerable pressure is exerted upon the filter 30. It is consequently necessary to reinforce and support said filter which is accomplished by attaching a spiral of wire 31 in helical form on the lower surface of the baffle plate. The convolutions of the wire 31 tend to uniformly support the filter 30 and prevent the drawing of the filter 30 into the perforations of the baffle plate. The filter may be made of any suitable filtering means, such as silk, cloth, wire, paper, felt, etc., depending upon the degree of filtration desired.

The filter is held on the filter supporting means 15 by means of an annular slip ring 32 equipped with spring fingers 33 which ride on the shoulder 34 of the filter supporting means 15. This ring may be easily removed to provide for the ready renewal or replacement of the filter 30. In assembling the filter the baffle plate is pressed into position on the inside of the filter supporting means 15 and is located by means of the stud 17 and the screw 21 so that the outer surface of the wire convolutions 31 will rest in the same plane as the lower surface of the filter supporting means 15. The filter 30 is then stretched over the filtration area of the supporting means 15 and the annular ring 32 pressed into place over the filter thus holding the filter in position. When the filter has been thus assembled, the sleeve 16 is slipped over the nozzle supply pipe 6 and the pin 36 of the sleeve is slipped into the slot 37 of the tube 6 and the two are locked together by the resulting bayonet joint, as illustrated in Figs. 2 and 4.

For the successful operation of the pneumatic brush it is essential that the connection between the tube 6 and the sleeve 16 be either sealed, or if the filter is detachably mounted on the tube 6, as herein described, the tube 6 should be extended to substantially the bottom of the container. This construction is necessary to prevent air leakage at the joint between the tube 6 and the sleeve 16 when the level of the fluid in the container falls below said joint. Thus it will be evident that if any air were admitted at this union, the suction of the brush would be materially impaired.

The invention as herein described has been disclosed in connection with a hand sprayer in which the nozzle supply pipe enters the fluid container close to the side of said container. It will be evident, however, that the invention can be readily applied to any type of brush or sprayer and that it is capable of other applications and variations without departing from its spirit and scope, as expressed in the appended claims.

What is claimed is:

1. A device of the character described comprising in combination, a liquid feeding tube, a filter supporting means detachably mounted on said tube, a perforated baffle plate mounted in said supporting means, a filtering means detachably mounted on said supporting means through which the fluid is drawn into said feeding tube, and resilient means intermediate said plate and said filter whereby a desired spaced relationship is maintained between said plate and said filter.

2. A device of the character described comprising in combination, a liquid feeding tube, a filter supporting means detachably mounted on said tube, a perforated baffle plate mounted in said supporting means, a filtering means detachably mounted on said supporting means through which the fluid is drawn into said feeding tube, and a spiral spring helically mounted on said plate intermediate said plate and said filter to support and reinforce said filter.

3. A device of the character described, comprising in combination, a liquid container, a liquid feeding tube within said container, a filter supporting means detachably mounted on said tube, a filtering means detachably mounted from said supporting means through which the liquid is drawn into said feeding tube, a baffle plate mounted in said supporting means perforated to give a maximum suction at substantially the median line of said filter, and resilient means intermediate said plate and said filter to support and reinforce said filter and also permit the flow of liquid therethrough.

In witness whereof, I hereunto subscribe my name this 25th day of October, A. D. 1916.

GEORGE ELLIOT PERRY.